United States Patent [19]
Celada et al.

[11] 3,765,872
[45] Oct. 16, 1973

[54] METHOD AND APPARATUS FOR THE GASEOUS REDUCTION OF IRON ORE TO SPONGE IRON

[75] Inventors: Juan Celada; David Villarreal; Patrick W. MacKay, all of Monterrey, Mexico

[73] Assignee: Fierro Esponja, S.A., Monterrey, Mexico

[22] Filed: Dec. 16, 1970

[21] Appl. No.: 98,612

Related U.S. Application Data
[63] Continuation-in-part of Ser. No. 55,161, July 15, 1970, abandoned.

[52] U.S. Cl. .................................... 75/34, 75/35
[51] Int. Cl. ............................... C21b 13/00
[58] Field of Search .................. 75/34, 35

[56] References Cited
UNITED STATES PATENTS

| | | | |
|---|---|---|---|
| 2,862,808 | 12/1958 | De Jahn | 75/34 |
| 3,601,381 | 8/1971 | Beggs | 75/34 X |
| 3,369,888 | 2/1968 | Cruse | 75/34 |
| 2,609,288 | 9/1952 | Stuart | 75/34 |
| 3,348,941 | 10/1967 | King | 75/34 X |
| 1,401,222 | 12/1921 | Wiberg | 75/35 |
| 2,528,553 | 11/1950 | Royster | 75/35 X |
| 2,635,957 | 4/1953 | Kalling et al | 75/35 |
| 2,807,535 | 9/1957 | Segre | 75/35 |
| 3,189,438 | 6/1965 | Von Bogdandy | 75/34 |

OTHER PUBLICATIONS
"Perry's Chemical Engineers Handbook;" 4th Ed.; McGraw-Hill; 1963; page 22–99.

*Primary Examiner*—L. Dewayne Rutledge
*Assistant Examiner*—M. J. Andrews
*Attorney*—Curtis, Morris & Safford

[57] ABSTRACT

Method and apparatus for reducing particulate metal ore, e.g., iron ore, to metal particles, e.g., sponge iron, in a vertical shaft, moving bed reactor having a reduction zone and a cooling zone wherein separate streams of reducing gas and cooling gas are used in the reduction and cooling zones, respectively, and means are provided for minimizing commingling of the two gas streams. In one embodiment a differential pressure controller is used to maintain substantially equal the gas pressure at the bottom of the reduction zone and the gas pressure at the top of the cooling zone. In another embodiment the flows of inlet gas to and outlet gas from the cooling zone are controlled to maintain these two flows substantially equal. Either or both of the reducing gas and cooling gas may be recycled in a closed loop.

20 Claims, 3 Drawing Figures

PATENTED OCT 16 1973 3,765,872

METHOD AND APPARATUS FOR THE GASEOUS REDUCTION OF IRON ORE TO SPONGE IRON

This application is a continuation-in-part of pending application Ser. No. 55,161 filed July 15, 1970, now abandoned.

This invention relates to the gaseous reduction of particulate metal ores to metals in particulate form in a moving bed, vertical shaft reactor, and more particularly, to an improved method and apparatus for controlling the reduction of the ore and the cooling of the resulting metal particles. In the following description the method and apparatus are illustratively described as applied to the reduction of iron ore to sponge iron. However, as the description proceeds it will be evident to those skilled in the art that the invention is also applicable to the treatment of ores other than iron ore.

Broadly speaking, the production of sponge iron in a vertical shaft, moving bed reactor ordinarily involves two principal steps, namely, reduction of the ore in a reduction zone with a suitable hot reducing gas, typically a gas largely composed of carbon monoxide and hydrogen, at temperatures of the order of 850° to 1,100° C., preferably 900° to 1,000° C., and cooling of the resulting sponge iron with a gaseous coolant to a temperature of the order of, say, 100° to 200° C., preferably below 100° C. In a number of the previously proposed processes, cooling of the sponge iron is effected by passing a portion of the reducing gas at relatively low temperature upwardly through the cooling zone of the reactor whereby the reducing gas temperature is increased and the temperature of the sponge iron is reduced, and then introducing additional hot reducing gas at the bottom of the reduction zone of the reactor.

This mode of operation is subject to the disadvantage that it does not permit fully independent control of the reduction and cooling steps of the process. The sponge iron product is commonly used as the charge, or part of the charge, to an electric steel-making furnace and it has been found that when used for this purpose the sponge iron should desirably be carburized. Such carburization can be conveniently carried out by using as a coolant a carbon-containing gas which cracks as it passes over the hot sponge iron and deposits carbon thereon. However, in order to achieve a particular desired degree of carburization, as well as the desired cooling effect, the composition and flow rate of the coolant gas should be controllable independently of the conditions existing in the reduction zone of the furnace.

It is further important that the sponge iron be sufficiently cooled before it is discharged from the reactor, since if it is exposed to atmospheric air at too high a temperature, it tends to re-oxidize. For this reason also it is desirable that the composition, flow rate and/or temperature of the gases in the reduction and cooling zones be independently controllable. However, if different gas streams are used in the two zones, there is a tendency for the gases to commingle at the junction of the two zones and produce indeterminate changes in the properties of one or the other of the two gases or both.

It is accordingly an object of the present invention to provide an improved method and apparatus for achieving essentially independent control of gas flow in the reduction and cooling zones of a vertical shaft, moving bed, ore reduction reactor. It is another object of the invention to provide a method and apparatus which permits such control while minimizing commingling of the two gas streams. Other objects of the invention will be in part obvious and in part pointed out hereafter.

The many objects and advantages of the present invention can best be understood and appreciated by reference to the accompanying drawings which illustrate sponge iron production systems incorporating several embodiments of the apparatus invention, which apparatus is capable of being used to carry out the method of the invention.

Figure 1:
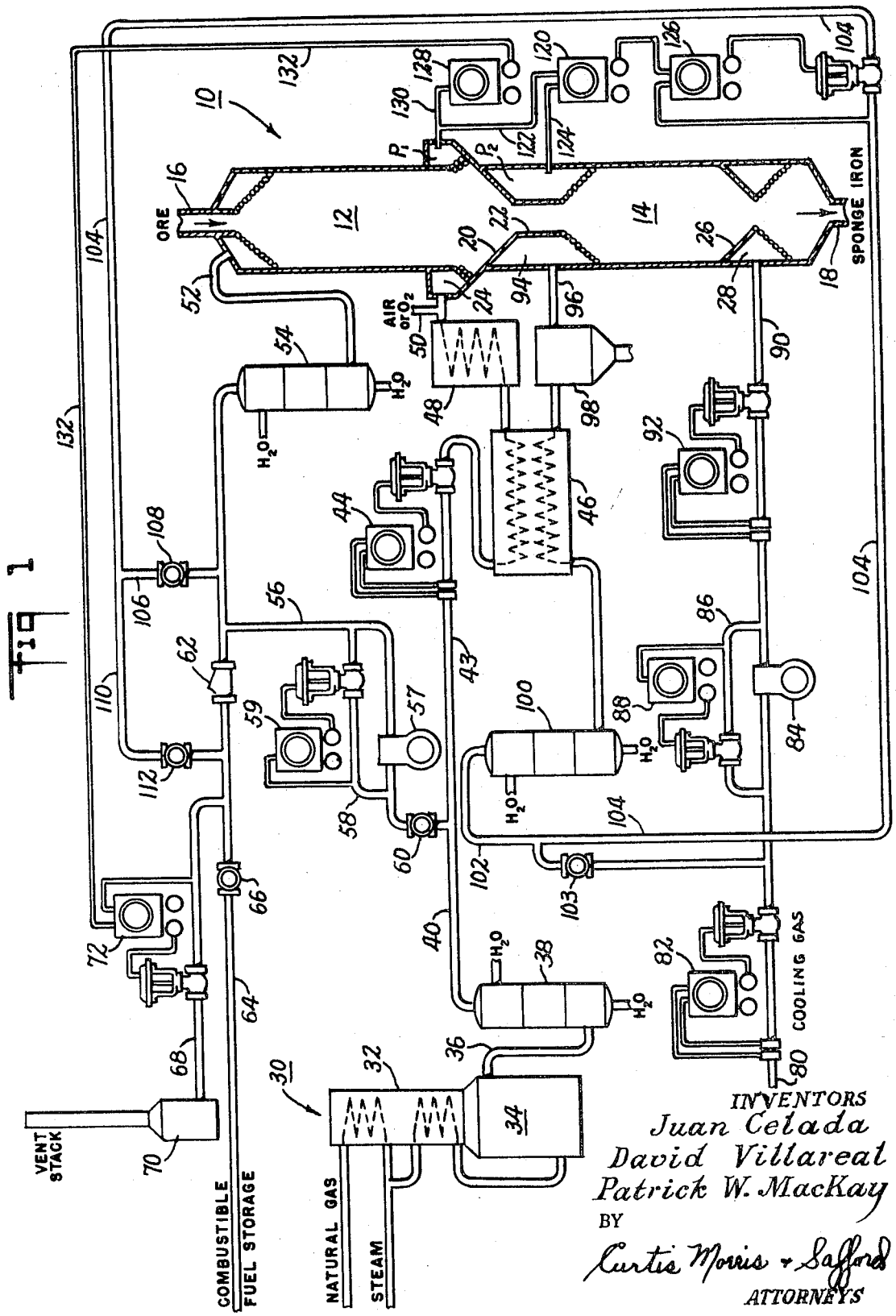
FIG. 1 illustrates diagrammatically a sponge iron production system wherein separate gas streams are fed to the reduction and cooling zones of the reactor and commingling of the gases is minimized by establishing a substantially zero pressure difference between the reduction and cooling zones.

Referring to the drawings, and particularly FIG. 1, numeral 10 generally designates a vertical shaft reactor having a reduction zone 12 in the upper portion thereof and a cooling zone 14 in the lower portion thereof. The reactor 10 is suitably heat insulated and is interiorly lined with a refractory material in a manner known in the art. Particulate ore to be treated is introduced into the reactor 10 through a charging pipe 16. The ore to be charged may be in the form of either lumps or preformed pellets. It flows downwardly through the reduction zone wherein it is largely reduced to sponge iron by upwardly flowing reducing gas, then through the cooling zone 14 wherein it is cooled by upwardly flowing cooling gas and leaves the reactor through the outlet pipe 18.

At the junction of the reduction and cooling zones there is an internal frusto-conical baffle 20 which guides the downwardly flowing ore particles to a conduit 22 leading to the cooling zone 14. The baffle 20 extends through the wall of the reactor and forms part of an annular plenum chamber 24 extending around the periphery of the reactor and providing a means for feeding the incoming reducing gas to the reduction zone through a space between the reactor wall and the baffle 20.

Near the bottom of reactor 10 there is a frustoconical baffle 26 which, together with the reactor wall, defines an annular space 28 through which the cooling gas flows to the body of ore particles in the cooling zone 14. If desired, the reactor 10 may be operated at an elevated pressure in which event the ore is fed at the top of the reactor and sponge iron removed from the bottom of the reactor by using suitable feed and discharge apparatus adapted to maintain the desired pressure in the reactor.

Referring to the left-hand portion of FIG. 1, reducing gas is typically generated in a reformer 30 of a known type. In the embodiment of the reformer, shown in FIG. 1, natural gas and steam are preheated by being passed through coils in the stack portion 32 of the reformer and a mixture of preheated natural gas and steam are caused to flow through a heated catalyst bed in the lower portion 34 of the reformer wherein they are converted to a gas mixture consisting largely of carbon monoxide, hydrogen and water vapor. The gas mixture then flows through pipe 36 to a quench cooler 38 wherein the gas is quenched to remove most of the water vapor therefrom. Upon leaving cooler 38, gas flows through pipe 40 and pipe 43 to a flow controller 44 which operates to establish a predetermined flow of reducing gas to the reactor.

In the system shown in FIG. 1, the reducing gas is heated to the desired reducing temperature of, say, 900° to 1,000° C. in several stages. Thus the controlled flow of gas after leaving controller 44 passes through a heat exchanger 46 in heat exchange contact with the exit cooling gas as will be further described below, and thence through a coil heater 48, which may be gas-filled or otherwise heated, to raise the reducing gas temperature to the order of 700° to 850° C. Since the reducing temperature should desirably be of the order of 900° to 1,000° C., the temperature of the reducing gas leaving heater 48 is further increased by adding a relatively small amount of air or oxygen thereto through pipe 50 and burning a small amount of the reducing gas to raise the temperature of the mixture to the desired value. Especially in cases where air is used as the oxidant, the oxidant is desirably preheated to approximately the temperature of the reducing gas with which it is mixed. Such preheating can be effected, for example, in a coil heater such as the coil heater 48. The addition of air or oxygen to the reducing gas may be effected, for example, as disclosed in U. S. Pat. No. 2,900,247. The reducing gas as thus prepared flows into the plenum chamber 24 and upwardly through the reduction zone 12 as previously described.

Spent reducing gas leaves the reactor through discharge connection 52 and flows to a water-cooled quench cooler 54. Upon leaving the quench cooler 54, the gas stream may be divided into several sub-streams. Thus if it is desired to recycle a portion of the reducing gas, the recycled gas may be caused to flow through pipe 56 containing compressor 57 and regulating valve 60 to pipe 43 wherein it is combined with the freshly prepared reducing gas. The compressor 57 may be designed to have a capacity somewhat greater than that required to recycle the desired amount of reducing gas and may be provided with a by-pass 58 and pressure controller 59 that operate to maintain the compressor discharge pressure substantially constant.

Another portion of the spent reducing gas may flow through a check valve 62 and pipe 64 containing valve 66 to a storage container for fuel gas. Spent reducing gas that is neither recycled nor passed to the fuel storage may flows through pipe 68 to a vent stack 70. Pipe 68 is provided with an automatic pressure controller 72 for maintaining a suitable back pressure on the gas reduction system. It will be understood that all of the spent reducing gas may be caused to flow through any one or more of the three paths described above. However, for economical operation at least a substantial part of the spent reducing gas should be recycled.

As indicated above, the reduced ore is cooled by a cooling gas in the cooling zone 14 of the reactor. Referring to the lower left-hand portion of FIG. 1, cooling gas enters the system through a pipe 80 provided with an automatic flow controller 82. A wide variety of cooling gases may be used including hydrogen, carbon monoxide, mixtures thereof, methane or other hydrocarbon gas, carbon dioxide or nitrogen. The choice of a cooling gas depends upon such factors as whether it is desired to carburize as well as cool the sponge iron and whether the spent cooling gas is to be later used in some part of the reducing gas system.

Upon entering the cooling gas system the cooling gas flows to a compressor 84 having a by-pass 86 provided with a pressure controller 88 which, like controller 59, operates to maintain a constant pressure at the compressor discharge. The cooling gas then flows through pipe 90 which is provided with an automatic flow controller 92 to the annular space 28 in reactor 10, thence upwardly through the cooling zone 14 to an annular space 94 defined by baffle 20, conduit 22 and the wall of the reactor. As indicated above, carburization of the sponge iron can be effected in cooling zone 14 by using a carbon-containing cooling gas that is cracked in contact with the hot sponge iron to deposit carbon thereon. The heated cooling gas leaves the reactor through pipe 96 and flows through a conventional dust separator 98 to the heat exchanger 46 wherein it gives up a portion of its heat to the reducing gas as described above.

From exchanger 46 the cooling gas flows to and through a water-cooled quench cooler 100 and is then recycled through pipe 102 containing valve 103 to the inlet of compressor 84. A portion of the recycled gas is diverted through pipe 104 and flows to the spent reducing gas portion of the system shown near the top of FIG. 1. As illustrated in the drawing, this diverted gas may flow through a pipe 106 containing valve 108 to the reducing gas loop or through pipe 110 containing valve 112 to the combustible fuel storage or the vent stack 70. While it is generally desirable to establish a closed cooling gas loop as just described, in particular cases valve 103 can be closed and all of the cooling gas leaving quench cooler 100 may be caused to flow through pipe 104.

As indicated above, the present invention provides method and apparatus for minimizing commingling of the reducing gas and cooling gas in the reactor. Referring to the right-hand portion of FIG. 1, a differential pressure controller 120 is provided which is made responsive through pipe 122 to the pressure is plenum chamber 24 (designated $P_1$) and through a pipe 124 to the pressure in annular space 94 (designated $P_2$). The differential pressure controller 120 establishes a signal, e.g., a pneumatic pressure, which is a function of the difference between pressures $P_1$ and $P_2$ and this signal is used to adjust the setting of a pressure controller 126 in the pipe 104 and thereby regulate the back pressure in the diverted cooling gas pipe 104 in such manner as to make pressure $P_2$ substantially equal to pressure $P_1$. Thus the interior of conduit 22 becomes a substantially isobaric zone and commingling of the reducing gas and cooling gas is minimized. It is further desirable, although not essential, that the pressure $P_1$ be maintained constant and that the flow through pipe 104 be adjusted to bring the pressure $P_2$ to a value equal to $P_1$. To this end, an automatic pressure controller 128 is made responsive to the pressure $P_1$ through pipe 130 and the controller output is conducted through pipe 132 to the pressure controller 72 to adjust the set point of the latter controller in such manner that the spent reducing gas is vented at a rate such as to maintain the pressure $P_1$ substantially constant. It has been found that by maintaining the pressure $P_1$ constant in this manner the pressure within conduit 22 can be maintained more nearly isobaric.

It will be evident from the foregoing description that the apparatus illustrated permits the use of separate reducing gas and cooling gas loops including the reduction zone and cooling zone of the reactor, respectively. The composition, flow rate and temperature of the reducing and cooling gases can be independently controlled so that each gas performs its desired different function in an optimum manner and to an optimum extent and the overall efficiency of the reactor is enhanced.

Figure 2:
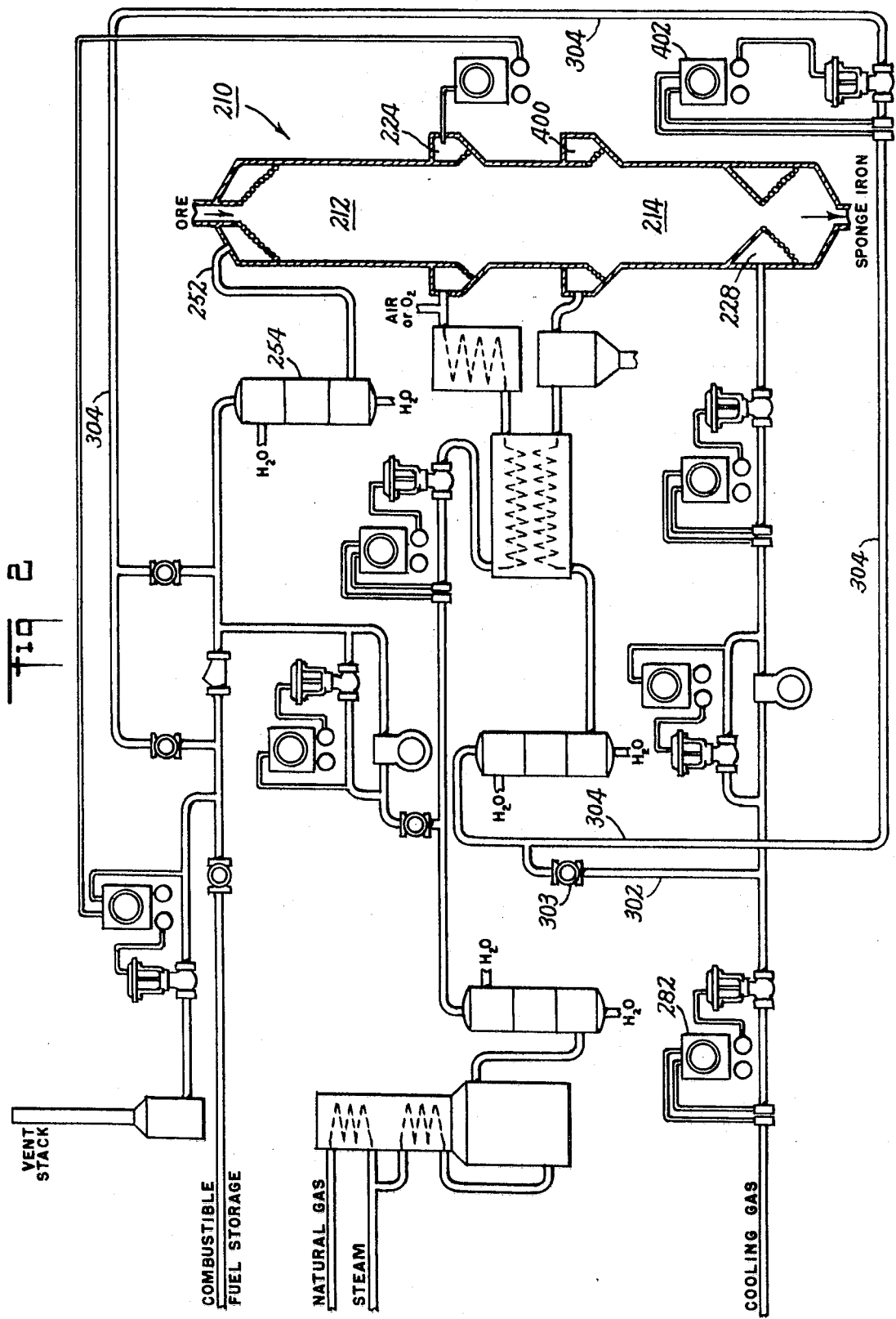
FIG. 2 shows a similar system wherein commingling of the gases is minimized by directly controlling the gas input flow to and gas removal flow rate from the cooling zone; and, FIG. 3 shows a system wherein the reducing gas and cooling gas may be fed to either the top or bottom of the reducing zone and cooling zone, respectively.

Turning now to FIG. 2 of the drawings, the system there shown is largely the same as that shown in FIG. 1, and hence only the differences between the system of FIG. 2 and FIG. 1 will be described. In the reactor of FIG. 1 a baffle 20 and conduit 22 are provided near the center of the reactor to cause the downwardly flowing body of ore particles to converge near the center of the reactor. In some cases the nature of the ore is such that the particles tend to agglomerate during the reduction step and in such cases a convergence of the flowing ore bed as provided in the reactor of FIG. 1 could result in obstruction of the flow of ore particles at the entry of conduit 22. To provide for this contingency, the baffle 20 is eliminated in the reactor of FIG. 2.

Referring to FIG. 2, the reactor 210 comprises a reduction zone 212 and cooling zone 214 similar to the zones 12 and 14 of FIG. 1. The reducing gas is introduced into the reactor through a plenum chamber 224 similar to the chamber 24 and leaves the reactor through a discharge connection 252. Cooling gas enters an annular space 228 similar to the annular space 28 of reactor 10 and flows upwardly through a cooling zone 214. However, reactor 210 differs from reactor 10 in that removal of the cooling gas is effected through an annular plenum chamber 400 rather than the annular space 94 of reactor 10.

In the embodiment of FIG. 2 commingling of the cooling and reduction gases is minimized by approximately equalizing the flow of gas into and removal of gas from the cooling zone. In FIG. 2 a flow controller 282 similar to flow controller 82 of FIG. 1 controls constant the flow of cooling gas into the cooling gas loop. However, in the system of FIG. 2 the pressure controller 126 of FIG. 1 is replaced by a flow controller 402 which is set to maintain the cooling gas outflow approximately equal to the input as controlled by controller 282, thus maintaining the quantity of cooling gas in the cooling zone substantially constant. In practice the controller 402 is ordinarily set to pass a bit more gas than controller 282 so that there will be a slight flow of reducing gas from the reduction zone to the cooling zone, thereby ensuring that the reducing gas will not be contaminated by a flow of cooling gas into the reduction zone. On the other hand, in particular cases it may be desirable to avoid contamination of the cooling gas by the reducing gases and in such cases the controller 402 is set to pass somewhat less gas than controller 282. The system of FIG. 2, like that of FIG. 1, provides for essentially independent control of the reducing gas and cooling gas streams.

In the embodiments of the present invention shown in FIGS. 1 and 2, counter-current flow of the reducing gas and descending ore particles is employed and counter-current flow of the cooling gas is also employed. While such counter-current flow is generally desirable, there are some instances in which co-current flow of the reducing gas and ore are advantageous. In general, the rate at which the ore is reduced varies directly as a function of the temperature of the reducing gas. It is known that the reducing gas temperature is an especially important factor in determining the reduction reaction rate in the early stages of the reduction process. Thus, under certain conditions, by using co-current flow of the reducing gas and ore, an increase in the average reduction rate can be achieved, with the result that a given degree of reduction can be achieved with a shorter residence time of the solids in the reduction zone, or a greater degree of reduction can be achieved using the same residence time, all other factors being the same. Also in some cases cocurrent flow of the cooling gas in the cooling section of the reactor may be desirable.

In general, the choice as to whether counter-current flow or co-current flow of the reducing gas and ore is used depends upon such factors as the solid flow characteristics of the ore particles, the reduceability of the ore, the composition of the reducing gas and the heat transfer characteristics of the gas and ore particles. Thus improved operating flexibility can be achieved by providing a system wherein either counter-current or co-current gas flow can be used in the reactor. Such a system is illustrated in FIG. 3 of the drawings.

Figure 3:
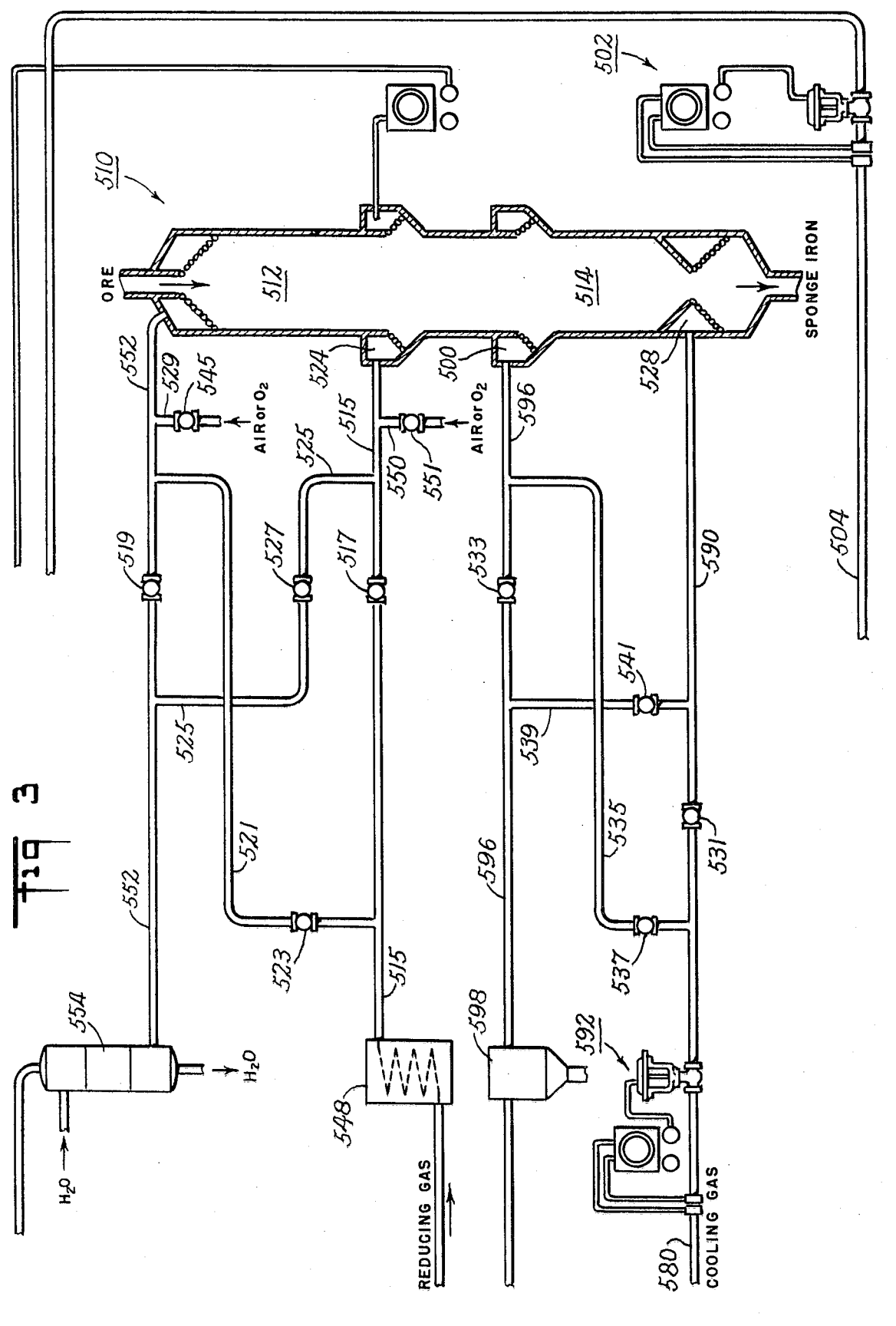

Since the embodiment of the present invention which permits selective use of counter-current or co-current gas flow in the reactor is generally similar to the embodiments illustrated in FIGS. 1 and 2, only those portions of the system which provide for selective use of counter-current or co-current gas flow are illustrated in FIG. 3. Referring to FIG. 3, the reactor 510 is similar to the reactor 210 of FIG. 2 and comprises a reduction zone 512 in the upper portion thereof and a cooling zone 514 in the lower portion thereof. Referring to the left-hand portion of FIG. 3, the reducing gas is heated in a heater 548, similar to the heater 48 of FIG. 1, which is connected by a pipe 515 containing a valve 517 to the plenum chamber 524 of reactor 510. At a point near plenum chamber 524 pipe 515 is connected to a branch pipe 550, similar to the pipe 50 of FIG. 1, containing a valve 551. As in the case of pipe 50, air or oxygen may be added to the reducing gas stream through pipe 550 to increase the reducing gas temperature to the desired value.

Connected to reactor 510 near the top of reduction zone 512 there is a pipe 552, corresponding to pipe 52 of FIG. 1, which contains a valve 519 and leads to cooler 554, similar to the cooler 54 of FIG. 1. At a point near the top of the reactor, pipe 552 communicates with a branch pipe 529 containing a valve 545 through which air or oxygen can be supplied to pipe 552.

In order to provide for co-current flow of the reducing gas and ore in the reduction zone 512, when desired, pipe 515, at a point between heater 548 and valve 517, is connected by a pipe 521 containing a valve 523 to pipe 552 at a point between reactor 510 and valve 519. Also pipe 515, at a point between valve 517 and chamber 524, is connected by a pipe 525 containing valve 527 with pipe 552 at a point between valve 519 and cooler 554.

In cases where counter-current flow of the reducing gas and ore is desired, valves 523, 527 and 545 are closed, valves 517 and 519 are opened and valve 551 is opened to an extent sufficient to allow a desired flow of air or oxygen into pipe 515. Reducing gas then flows from heater 548 through pipe 515 to chamber 524 and thence upwardly through the ore body in reduction zone 512. The reducing gas leaves the reactor near the top of the reduction zone 512 and flows through pipe 552 to cooler 554.

In cases where co-current flow of the reducing gas and ore are desired, valves 517, 519 and 551 are closed, valves 523 and 527 are opened and valve 545 is opened to such an extent as to establish a desired flow of air or oxygen into pipe 552. Reducing gas from heater 548 then flows through pipes 521 and 552 to the top of the reduction zone 512 and downwardly through the ore body therein. The reducing gas leaves the reduction zone through plenum chamber 524 and flows through pipes 515, 525 and 552 to the cooler 554. Thus counter-current flow of gas and ore is achieved in a simple manner by closing valves 523 and 527 and opening valves 517 and 519, and co-current flow is achieved by closing valves 517 and 519 and opening valves 523 and 527.

As shown in the lower portion of FIG. 3, a similar arrangement is provided for selectively establishing either counter-current or co-current flow of the cooling gas in the cooling zone 514 of the reactor. The cooling gas is supplied to the system through a pipe 580 and flows through a flow controller 592, similar to the flow controller 92 of FIG. 1, and thence through a pipe 590 containing valve 531 and connected to the chamber 528 at the bottom of cooling zone 514. At the top of the cooling zone 514 there is a plenum chamber 500, similar to the chamber 400 of FIG. 2, which is connected by a pipe 596 containing valve 533 to the dust separator 598, which corresponds with the dust separator 98 of FIG. 1. In order to provide for co-current flow of the cooling gas through cooling zone 514, pipe 590 at a point between valve 531 and flow controller 592 is connected by a pipe 535 containing valve 537 with pipe 596 at a point between valve 533 and plenum chamber 500. Also pipe 590 at a point between valve 531 and chamber 528 is connected by a pipe 539 containing valve 541 to pipe 596 at a point between valve 533 and dust separator 598.

When it is desired to establish counter-current flow in the cooling zone, valves 531 and 533 are opened and valves 537 and 541 are closed. Cooling gas then flows through pipe 590 to chamber 528, upwardly through the cooling zone to chamber 500 and out of the reactor through pipe 596 to dust separator 598. On the other hand, when it is desired to establish co-current flow of the cooling gas and ore in cooling zone 514, valves 531 and 533 are closed and valves 537 and 541 opened to cause the cooling gas to flow from flow controller 592 through pipes 535 and 596 to plenum chamber 500 and thence downwardly through the ore body in the cooling zone. The cooling gas after passing through the cooling zone enters chamber 528 and flows through pipes 590, 539 and 596 to dust separator 598. It is evident that with the system illustrated in FIG. 3 either counter-current or co-current flow of the gas may be established in either the reduction zone or the cooling zone of the system.

In the system shown in FIG. 3 intermingling of the reducing gas and cooling gas is minimized in the same manner as described in connection with FIG. 2. The flow of cooling gas to the cooling gas loop is controlled constant by a flow controller (not shown in FIG. 3 but corresponding to the controller 282 of FIG. 2). Cooling gas leaving the cooling gas loop flows through pipe 504, corresponding to pipe 304 of FIG. 2, to the flow controller 502, corresponding to the flow controller 402 of FIG. 2. The flow controller 502 is set to maintain the flow of cooling gas removed from the system substantially equal to the flow of cooling gas into the system and thereby minimizes intermingling of the cooling gas and reducing gas.

It is, of course, to be understood that the foregoing description is intended to be illustrative and that the embodiments described can be modified in various ways within the scope of the invention. For example, the reducing gas employed need not be made in a catalytic reformer of the type illustrated at 30, but may be made, for example, by the partial oxidation of a hydrocarbon, or pure hydrogen may be used. The gas heater 48 may be so operated as to bring the reducing gas to an acceptable reducing temperature without addition of air or oxygen through pipe 50. Since the cooling gas is heated in the zone 14, if reactive gases are used as coolants, they may be reformed to such an extent that, after removal from the cooling loop, they may be advantageously introduced into the reducing gas stream. However, the composition and flow rate of the cooling gases should desirably be selected to achieve the primary function of efficient cooling and any reducing value of the spent cooling gas treated as an incidental advantage of the system.

As indicated above, independent control of both the reducing gas and cooling gas streams can be achieved without recycling these streams. However, the use of the closed loops is preferable becuase of the economies thereby obtained and because a greater degree of stability of the system is achieved and the minimizing of the commingling of the two streams is facilitated.

Further, as pointed out at the beginning of the specification, the present method and apparatus may be used in the reduction of ores other than iron ore, for example, ores of metals such as nickel, copper, tin, titanium, barium and calcium.

Other modifications within the scope of the invention will be apparent to those skilled in the art.

We claim:

1. The method of reducing particulate metal ores to metal particles in a vertical shaft, moving bed reactor which comprises establishing and maintaining a reduction zone for reducing said particulate metal ore in the upper portion of said bed and a cooling zone for cooling the reduced metal particles in the lower portion of said bed, feeding a hot reducing gas to one point in said reduction zone and causing it to flow through particulate ore in said reduction zone to a second spaced point in said reduction zone, removing said reducing gas from said reactor at said second point in said reducing zone, circulating a cooling gas in a closed loop including said cooling zone and a conduit external to said reactor containing a cooler for cooling said circulating cooling gas, feeding cooling gas at a predetermined rate to the external portion of said loop, venting cooling gas at a regulated rate from the external portion of said loop, measuring the pressure difference between the bottom of said reduction zone and the top of said cooling zone and regulating the rate at which gas is vented from said cooling gas loop to maintain said measured differential pressure substantially zero and thereby minimize mixing of said cooling gas and reducing gas in said reactor.

2. A method according to claim 1 wherein said reducing gas is fed to said reactor at a point near the bottom of said reduction zone and removed from said reactor at a point near the top of said reduction zone.

3. A method according to claim 1 wherein said reducing gas is fed to said reactor at a point near the top of said reduction zone and removed from said reactor at a point near the bottom of said reduction zone.

4. A method according to claim 1 wherein said cooling gas is fed to said reactor at a point near the bottom of said cooling zone and removed from said reactor at a point near the top of said cooling zone.

5. A method according to claim 1 wherein said cooling gas is fed to said reactor at a point near the top of said cooling zone and removed from said reactor at a point near the bottom of said cooling zone.

6. A method according to claim 1 wherein a portion of the reducing gas removed from said reactor is added to the reducing gas fed to said reactor to form a reducing gas loop and the remainder of the reducing gas removed from said reactor is continuously removed from said loop.

7. A method according to claim 1 wherein said cooling gas is a reducing gas and at least a regulated portion of the cooling gas vented from said cooling gas loop is added to the reducing gas fed to said reduction zone.

8. The method of reducing particulate metal ores to metal particles in a vertical shaft, moving bed reactor which comprises establishing and maintaining a reduction zone for reducing said particulate metal ore in the upper portion of said bed and a cooling zone for cooling the reduced metal particles in the lower portion of said bed, circulating a reducing gas in a closed loop including said reduction zone and a conduit external to said reactor, feeding reducing gas at a predetermined rate to the external portion of said reducing gas loop, venting reducing gas at a regulated rate from the external portion of said reducing gas loop, regulating the flow of at least a portion of the reducing gas vented from said reducing gas loop in response to the pressure at the bottom of said reduction zone to maintain the pressure at the bottom of said reduction zone substantially constant, circulating a cooling gas in a closed loop including said cooling zone and a conduit external to said reactor containing a cooler for cooling said circulating cooling gas, feeding cooling gas at a predetermined rate to the external portion of said loop, and venting cooling gas from the external portion of said loop at a regulated rate approximately the same as the rate at which cooling gas is fed to the external portion of said loop to minimize mixing of said cooling gas and said reducing gas in said reactor.

9. The method of reducing particulate iron ore to sponge iron in a vertical shaft, moving bed reactor which comprises establishing and maintaining a reduction zone for reducing said particulate iron ore to sponge iron particles in the upper portion of said bed and a cooling zone for cooling the sponge iron particles in the lower portion of said bed, feeding a hot reducing gas to a point in the reduction zone and causing it to flow through the particulate iron ore in said reduction zone to a second spaced point in said reduction zone, removing said reducing gas from said reactor at said second point in said reduction zone, circulating a cooling gas in a closed loop including said cooling zone and a conduit external to said reactor containing a cooler for cooling said circulating cooling gas, feeding cooling gas at a predetermined rate to the external portion of said loop, venting cooling gas at a regulated rate from the external portion of said loop, measuring the pressure difference between the bottom of said reduction zone and the top of said cooling zone and regulating the rate at which gas is vented from said cooling gas loop to maintain said measured differential pressure substantially zero and thereby minimize mixing of said cooling gas and reducing gas in said reactor.

10. The method of reducing particulate metal ores to metal particles in a vertical shaft, moving bed reactor which comprises establishing and maintaining a reduction zone for reducing said particulate metal ore in the upper portion of said bed and a cooling zone for cooling the reduced metal particles in the lower portion of said bed, feeding a hot reducing gas to one point in said reduction zone and causing it to flow through particulate ore in said reduction zone to a second spaced point in said reduction zone, removing said reducing gas from said reactor at said second point in said reduction zone, circulating a cooling gas in a closed loop including said cooling zone and a conduit external to said reactor containing a cooler for cooling said circulating cooling gas, feeding cooling gas at a predetermined rate to the external portion of said loop, and venting cooling gas from the external portion of said loop at a regulated rate approximately the same as the rate at which cooling gas is fed to the external portion of said loop to minimize mixing of said cooling gas and said reducing gas in said reactor.

11. A method according to claim 10 wherein said reducing gas is fed to said reactor at a point near the bottom of said reduction zone and removed from said reactor at a point near the top of said reduction zone.

12. A method according to claim 10 wherein said reducing gas is fed to said reactor at a point near the top of said reduction zone and removed from said reactor at a point near the bottom of said reduction zone.

13. A method according to claim 10 wherein said cooling gas is fed to said reactor at a point near the bottom of said cooling zone and removed from said reactor at a point near the top of said cooling zone.

14. A method according to claim 10 wherein said cooling gas is fed to said reactor at a point near the top of said cooling zone and removed from said reactor at a point near the bottom of said cooling zone.

15. A method according to claim 10 wherein at least a part of the reducing gas removed from said reactor is recycled and added to the reducing gas fed to said reactor to form a reducing gas loop and the remaining reducing gas is continuously removed from said loop.

16. A method according to claim 10 wherein said cooling gas is a reducing gas and at least a regulated portion of the cooling gas vented from said cooling loop is added to the reducing gas fed to said reduction zone.

17. A method according to claim 10 wherein the cooling gas is vented from said cooling loop at a rate slightly greater than the predetermined rate at which it is fed to said loop.

18. A method according to claim 7 wherein the cooling gas is vented from said cooling gas loop at a rate slightly less than the predetermined rate at which it is fed to said loop.

19. The method of reducing particulate metal ores to metal particles in a vertical shaft, moving bed reactor which comprises establishing and maintaining a reduction zone for reducing said particulate metal ore in the upper portion of said bed and a cooling zone for cooling the reduced metal particles in the lower portion of said bed, feeding a hot reducing gas to a point near one end of said reduction zone and causing it to flow through particulate ore in said reduction zone to the other end of said reduction zone, removing said reducing gas from said reactor at a point near said other end of said reducing zone, circulating a cooling gas in a closed loop including said cooling zone and a conduit external to said reactor containing a cooler for cooling said circulating cooling gas, feeding cooling gas at a predetermined rate to the external portion of said loop, venting cooling gas at a regulated rate from the external portion of said loop, measuring the pressure difference between the bottom of said reduction zone and the top of said cooling zone and regulating the rate at which gas is vented from said cooling gas loop to maintain said measured differential pressure substantially zero and thereby minimize mixing of said cooling gas and reducing gas in said reactor.

20. The method of reducing particulate metal ores to metal particles in a vertical shaft, moving bed reactor which comprises establishing and maintaining a reduction zone for reducing said particulate metal ore in the upper portion of said bed and a cooling zone for cooling the reduced metal particles in the lower portion of said bed, circulating a reducing gas in a closed loop including said reduction zone and a conduit external to said reactor, feeding reducing gas at a predetermined rate to the external portion of said reducing gas loop, venting reducing gas at a regulated rate from the external portion of said reducing gas loop, circulating a cooling gas in a closed loop including said cooling zone and a conduit external to said reactor containing a cooler for cooling said circulating cooling gas, feeding cooling gas at a predetermined rate to the external portion of said cooling gas loop, venting cooling gas at a regulated rate from the external portion of said cooling gas loop, regulating the flow of at least a portion of the reducing gas removed from said reducing gas loop in response to the pressure at the bottom of said reduction zone to maintain the pressure at the bottom of said reduction zone substantially constant, measuring the pressure difference between the bottom of said reduction zone and the top of said cooling zone and regulating the rate at which gas is vented from said cooling gas loop to maintain said measured differential pressure substantially zero and thereby minimize mixing of said cooling gas and reducing gas in said reactor.

* * * * *